United States Patent [19]

Shimizu et al.

[11] Patent Number: 4,983,465
[45] Date of Patent: Jan. 8, 1991

[54] THIN FILM MAGNETIC HEAD

[75] Inventors: Osamu Shimizu; Satoshi Yoshida, both of Kanagawa, Japan

[73] Assignee: Fuji Photo Film Co., Ltd., Kanagawa, Japan

[21] Appl. No.: 413,503

[22] Filed: Sep. 27, 1989

[30] Foreign Application Priority Data

Oct. 4, 1988 [JP] Japan .................................. 63-249056

[51] Int. Cl.$^5$ .................................................. G11B 5/22
[52] U.S. Cl. ..................................... 428/472; 428/469; 428/694; 428/900; 204/192.16; 360/126
[58] Field of Search ............... 428/692, 693, 694, 900; 360/126, 122, 127

[56] References Cited

U.S. PATENT DOCUMENTS

| | | | |
|---|---|---|---|
| 4,681,813 | 7/1987 | Yamada et al. | 428/450 |
| 4,711,815 | 12/1987 | Yoshike et al. | 428/411.1 |
| 4,803,338 | 2/1989 | Kumasaka et al. | 360/122 |
| 4,824,222 | 4/1989 | Green | 350/357 |
| 4,875,987 | 10/1989 | Wada et al. | 204/192.15 |
| 4,898,774 | 2/1990 | Yamashita | 428/336 |

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A thin film magnetic head comprises: lower magnetic layer, insulating layer, upper magnetic layer and a protective layer, in this order, on a substrate, and has an end face exposed to a recording medium running surface. The protective layer is comprised of 20 to 75 mole % of $ZrO_2$ and 25 to 80 mole % of $WO_3$ ($ZrO_2$ being partly replaced by $Y_2O_3$, MgO, CaO and/or oxides of rare earth elements), with hardness Hv of 400 to 700 kgf/mm$^2$ adjustable according to selection of composition and residual not more than 0.35 GPa.

9 Claims, 4 Drawing Sheets

Vickers hardness [kgf/mm$^2$] (mol %)

Vickers hardness [kgf/mm²] (mol %)

THIN FILM MAGNETIC HEAD

FIELD OF THE INVENTION

This invention relates to a thin film magnetic head. More particularly, it relates to a thin film magnetic head having an improved protective layer which is laminated onto the magnetic layer.

BACKGROUND AND PROBLEMS TO BE SOLVED

In preparing a thin film magnetic head, upper and lower magnetic layers of sendust or amorphous materials are made on a substrate formed of a wear-resistant material, such as ferrite or sapphire. A coil conductor layer of conductive metals and an insulating layer are formed between these magnetic layers and subjected to repeated etching for patterning to a predetermined contour (pattern). Finally, a protective layer is formed for protecting the magnetic layers against wear caused by the running of the magnetic recording medium. Alumina or $SiO_2$ have been used as the material for the protective layer.

In the above construction, it is well-known that, when the protective layer is sufficiently harder than the magnetic layers, the magnetic layers undergo premature wear due to sliding contact with the running recording medium. This results in the partially advancing wear (partial abrasion) of the magnetic layers, which leads to a spacing loss.

On the other hand, if the protective layer is too soft, the magnetic head in its entirety tends to undergo premature wear, resulting in a shortened service life and decreased durability. It is therefore preferred for the hardness of the protective layer to be approximately equal to or slightly lower than that of the magnetic layers.

Also, in view of the sliding properties and the resistance to the recording medium and the partially advancing wear, the protective layer needs to be 20 to 40 $\mu$m or more in thickness. However, with such a film thickness, the protective layer usually undergoes peeling or cracking due to the cumulative internal stress. For this reason, the internal stress needs to be reduced to a value as low as possible. One effective method of obviating this drawback would be match to the coefficients of thermal expansion of the materials making up the magnetic head. However, it is generally difficult with conventional techniques to effect matching the coefficients of thermal expansion of the magnetic metal materials and the protective layer.

In the Japanese Patent KOKAI Publication No. 62-16218 (1987), a mixture of MgO and $SiO_2$ is disclosed as a protective layer for effectively suppressing such partially advancing wear. It is also described therein that a moderate hardness Hv of 450 to 850 kgf/mm$^2$ and a desired coefficient of thermal expansion may be realized by selecting the compositional ratio of MgO to $SiO_2$ so that the $SiO_2$ has a concentration of 10 to 70% in the MgO/$SiO_2$ mixture.

SUMMARY OF THE DISCLOSURE

For example, when using magnetic layers with a Vickers hardness Hv of 600 to 650 kgf/mm$^2$, the Vickers hardness Hv of the protective layer is preferably set at a range of Hv=400 to 600 kgf/mm$^2$.

Nevertheless this protective layer still does not satisfy the requirements for the protective layer with respect to corrosion resistance and machinability, subject to meeting the fundamental properties generally required as the protective layer.

It is a principal object of the present invention to provide a thin film magnetic head substantially free of the above mentioned drawbacks of the prior art device.

According to the present invention, there is provided a thin film magnetic head comprising a substrate provided with a lower magnetic layer, an insulating layer and an upper magnetic layer, in this order. A protective layer is formed on the upper magnetic layer and has an end face exposed to a recording medium running surface. The protective layer consists essentially of 20 to 75 mole % of $ZrO_2$ and 25 to 80 mole % of one or both of $WO_3$ and $MoO_3$.

Preferably, not more than 20 mole % of $ZrO_2$ is replaced by at least one of $Y_2O_3$, MgO, CaO and oxides of rare earth elements. These compounds act as the stabilizer for $ZrO_2$.

The protective layer of the thin film magnetic head of the present invention has a Vickers hardness Hv in the range of approximately 400 to 700 kgf/mm$^2$. Thus it is not too soft, while exhibiting excellent matching of the wear resistance with the Co-base amorphous materials or sendust usually employed as the magnetic layer (with Hv in the order of 650 kgf/mm$^2$) so that no partially advancing wear occurs on the magnetic layer.

When the protective layer is formed directly on the magnetic layer by sputtering or the like, the protective layer is subjected to less strain and substantially no residual stress, so that it is not susceptible to peeling or cracking.

Further the protective layer of the present invention is not degraded under high temperatures and moisture and exhibits superior corrosion resistant properties.

When formed on the magnetic layer and subsequently processed by machining operations, the protective layer is not subjected to peeling or cracking. On the other hand, it can be subjected to reactive etching with the use of a freon type gas (hydro-carbon fluoride gas).

DESCRIPTION OF THE PREFERRED EMBODIMENTS

The protective layer for the thin film magnetic head of the present invention is primarily composed of 20 to 75 mole % of $ZrO_2$ and 25 to 80 mole % of $WO_3$ and/or $MoO_3$.

If the amount of $WO_3$ and/or $MoO_3$ is less than 25 mole %, the hardness of the protective layer becomes higher than that of the customarily employed magnetic layer, exceeding 700 kgf/mm$^2$ in terms of the Vickers hardness. This results in partially advancing wear to the magnetic layer. Conversely, if the amount exceeds 80 mole %, the hardness of the protective layer is undesirably lowered to below 400 kgf/mm$^2$, thus causing premature, partially advancing wear of the protective layer. In this regard, an amount of $WO_3$ and/or $MoO_3$ in the range of 40 to 70 mole % is preferred in which a residual stress of 0.15 to 0.25 GPa and the Vickers hardness Hv of about 470 to about 600 kgf/mm$^2$ may be achieved.

The protective layer may be formed by sputtering, electron beam deposition, or gas phase deposition generally referred to as "vapor deposition technique". Since the layer contains not less than 25 mole % of $WO_3$ and/or $MoO_3$, it is possible to produce a protective layer which is subject to lesser strain and residual stress in the order of approximately 0.35 GPa or less, even when sputtering is employed. Therefore, the protective layer may be in situ formed in a stable state on the magnetic layer by any of the vapor deposition techniques referred to above.

In case where the protective layer is formed by sputtering, one or more of $Y_2O_3$, MgO, CaO and oxides of rare earth elements may be added to the composition for facilitating manufacture or availability. The oxides of rare earth element include oxides of, for example, Yb, Sc, Nd, Sm or the like. Thus the above mentioned stabilizer may be occasionally contained in the protective layer. The content of the stabilizer in the protective layer is not more than 20 mole % (preferably not more than 10 mole %) based on the total content of the main components of the protective layer. In practice, such amount of the stabilizer which will replace part of $ZrO_2$ for the sake of partial or complete stabilization of $ZrO_2$ would raise no particular problems.

As long as the properties required for the protective layer are satisfied, other components than those mentioned above, such as $SiO_2$, $Al_2O_3$ or clay, may also be contained in the composition as a sintering aid for sintering the target. The total amount of these additional components and the stabilizer is preferably not more than 20 mole % based on the content of $ZrO_2$.

EXAMPLES

Referring now to the accompanying drawings, an illustrative example of the present invention will be explained in detail.

Figure 1:
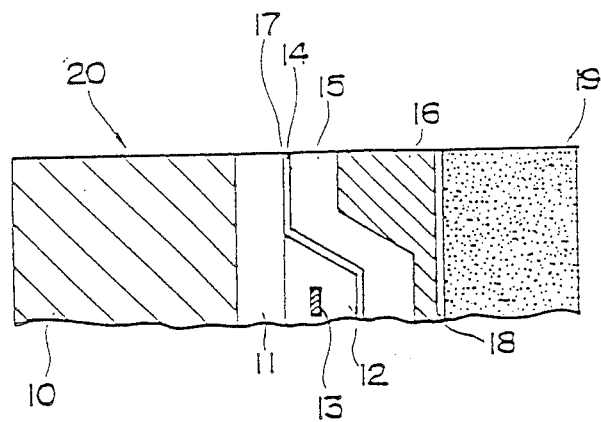
FIG. 1 is a cross-sectional view of an embodiment of a thin film type magnetic head according to the present invention.

FIG. 1 is a cross-sectional view showing the structure of a thin film magnetic head embodying the present invention. Referring to this figure, the process for manufacturing the magnetic head will be explained.

A ferromagnetic layer of a Co-Nb-Zr alloy is deposited on a ferrite substrate 10 by sputtering to form a lower magnetic layer 11. A nonmagnetic insulating layer 12, formed of, for example, $SiO_2$, and a coil conductor layer 13 formed of, for example, Cu or Al, are formed at predetermined positions on the lower magnetic layer 11 so as to dispose the coil conductor layer 13 within the nonmagnetic insulating layer 12. The nonmagnetic insulating layer 12 with the enclosed coil conductor layer 13 of Cu or Al is then processed, such as by ionic milling, so that the layers 12 and 13 will present a trapezoidal cross-section. Then, a magnetic gap layer 14 is formed on the lower magnetic layer 11 and the insulating layer 12. Gap 17 consists of the end part of the gap layer 14 separating the magnetic layers 11 and 15. Part of this layer 14 is then removed at a predetermined position (not shown) at which the lower magnetic layer 11 is to be directly connected and joined to an upper magnetic layer 15 which will be formed subsequently. A magnetic metal material of a Co-Nb-Zr alloy is then deposited to a thickness of 15 μm by sputtering to form the upper magnetic layer 15, which is joined at the predetermined position (not shown) to the lower magnetic layer 11.

A protective layer 16, characteristic of the present invention, is then formed on the upper magnetic film 15.

The protective layer 16 was formed in this example by an RF diode magnetron sputtering device. As a target, one having a composition of $(ZrO_2)_{97}(Y_2O_3)_3$ was employed. Small pieces of $WO_3$, each being of a square shape, with each side measuring 5 mm, were placed on the target so that the total surface area of these small pieces amounts to 11% of the entire target surface. The protective layer was formed to a thickness of 40 μm, under a gas pressure of 0.4Pa of Ar (containing 5% by weight of $O_2$), an electric power at the cathode of 350 W, an electrode-to-electrode distance of 55 mm and with the substrate being cooled with water. The protective layer thus formed contained 47.2 mole % of $ZrO_2$, 51.2 mole % of $WO_3$, and 1.6 mole % of $Y_2O_3$ as the target stabilizer.

After formation of the protective layer 16 in the above described manner, the protective layer 16 was flattened. A protective plate 19 was affixed by an epoxy adhesive layer 18 to the flattened protective layer 16. Next a recording medium running surface 20 was smoothed in a conventional manner to produce a thin film magnetic head embodying the present invention.

Although the composite oxides are provided in the above Example by placing the small pieces on the target, the target itself may naturally be formed of these composite oxides.

EVALUATION

Figure 2:
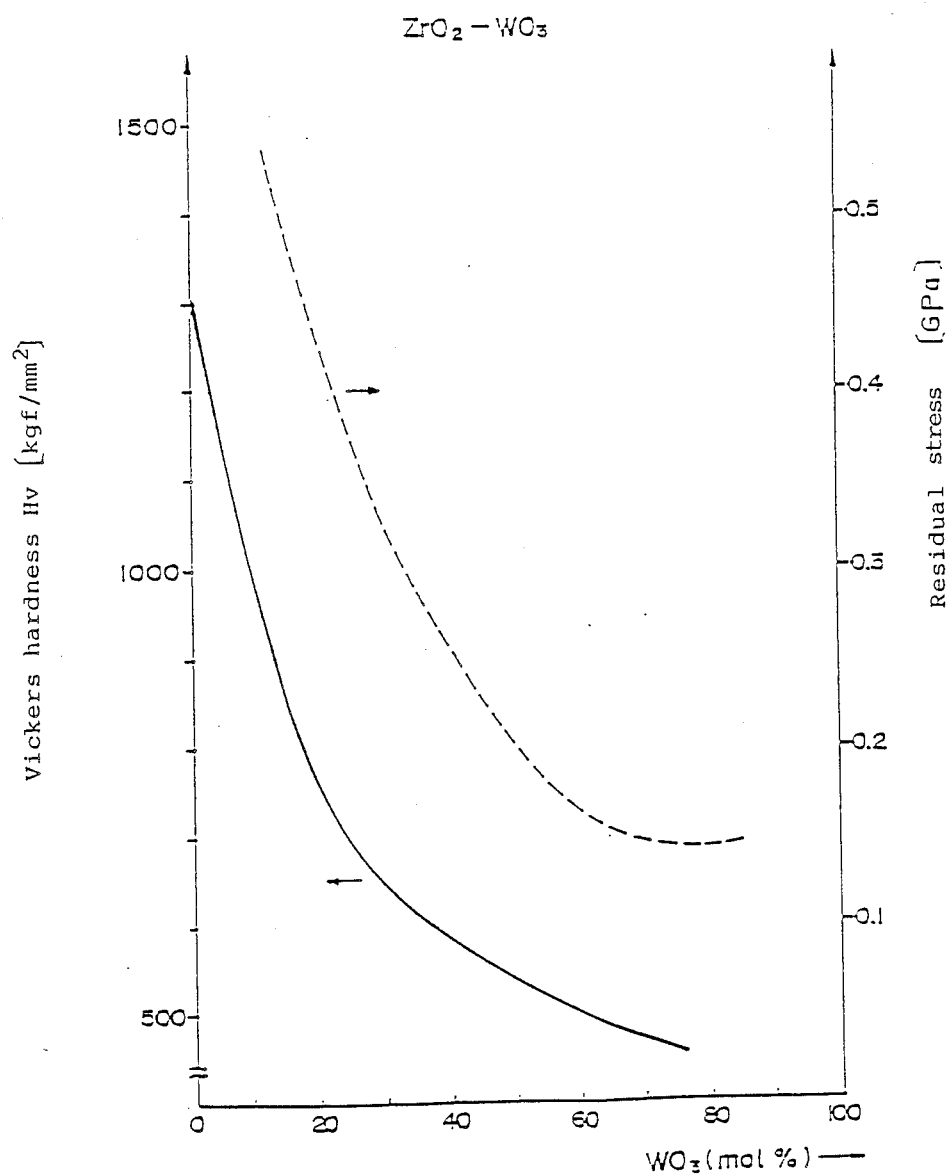
FIG. 2 is a graph showing the mole percentage of $WO_3$ versus the Vickers hardness Hv and the internal stress.

EXAMPLE (a) The hardness of the protective layer having a composition of $[(ZrO_2)_{0.97}(Y_2O_3)_{0.03}]_{1-x}[WO_3]_x$ was measured by a micro-Vickers hardness testing method, using a load weighing 25 g. The results are shown by a solid line in FIG. 2.

Figure 3:
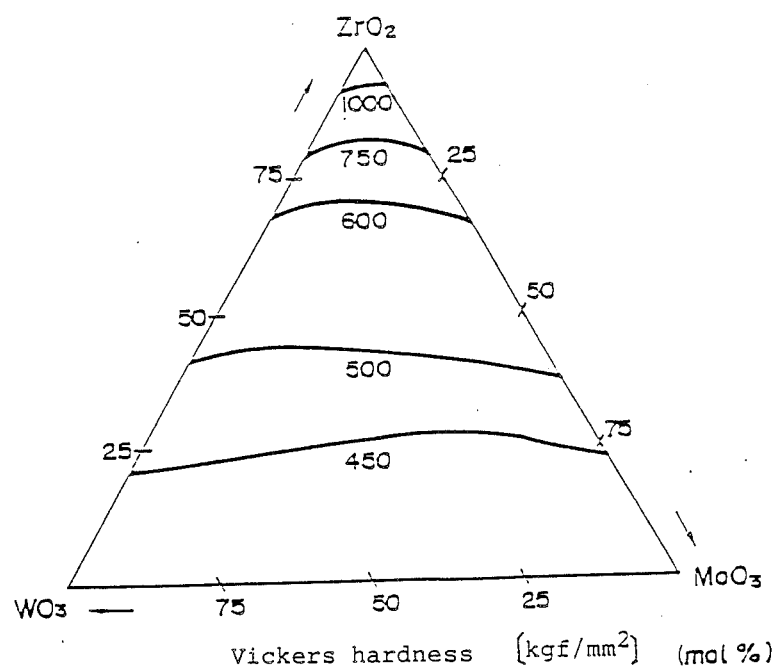
FIGS. 3 and 4 illustrate the results of measurement of the Vickers hardness and the residual stress of the protective layer consisting essentially of $ZrO_2$—$WO_3$—$MoO_3$.
Figure 4:
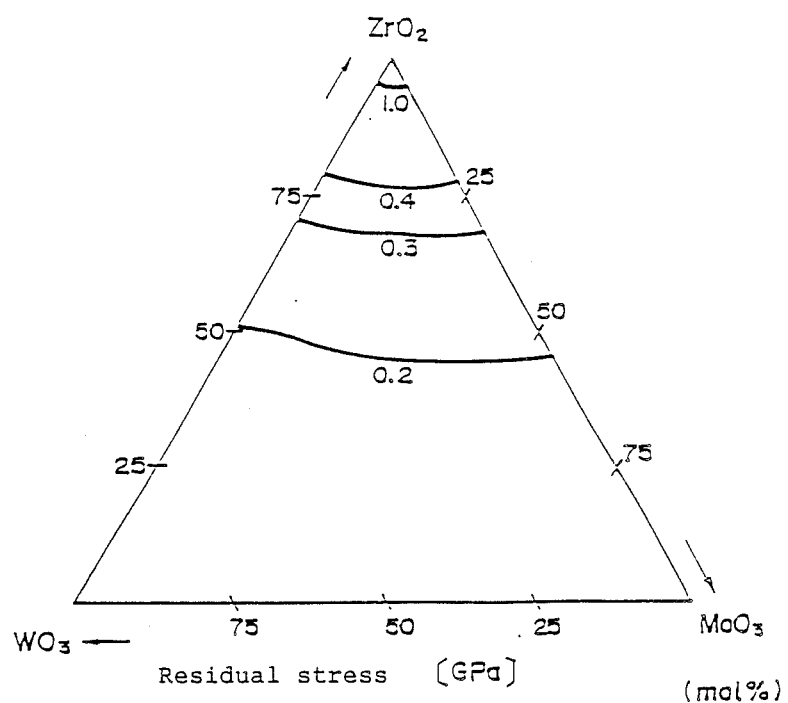

The hardness of the protective layer, composed mainly of $ZrO_2$—$WO_3$—$MoO_3$, was similarly measured. The results are shown in FIG. 3.

It can be seen from these figures that the hardness of the protective layer within the range of the present invention is more favorable than that of a conventional magnetic layer.

EXAMPLE (b) A protective layer of 5 μm in thickness, having a composition of $[(ZrO_2)_{0.97}(Y_2O_3)_{0.03}]_{1-x}[WO_3]_x$, was formed on a sapphire substrate of 0.3 mm thickness, by an RF magnetron sputtering device. The warping of the sapphire substrate was measured and the measured values were then converted into the residual stress of the protective layer. The conditions for film formation were the same as those of the preceding Example. The results are shown by a broken line in FIG. 2.

The residual stress was obtained in the same way as before except that the protective layer had the composition of $ZrO_2$—$WO_3$—$MoO_3$. The results are shown in Table 4.

It is seen from these figures that the protective layer on the substrate, having the composition within the range of the present invention, exhibits extremely small values of the residual stress.

EXAMPLE (c) Several thin film magnetic head samples of the present invention, manufactured in accordance with the process of the above described Examples, were mounted on a floppy disk apparatus and kept in contact with running recording media (Fujix VF-HR) for 1,000 hours to observe partially advancing wear caused to the head samples. For observing the partially advancing wear, interference fringes were observed with an optical flat to check for the presence of possible step-like differences in level between the magnetic layer and the protective layer. It was found that there were no such level differences in the case with the protective layer having the composition within the range defined by the present invention. Hence, no partially advancing wear was caused between the protective layer and the magnetic layer.

EXAMPLE (d) The protective layer of the thin film magnetic head of the present invention was allowed to stand for one week at a temperature of 40° C. and a relative humidity of 90% to check for its corrosion-resistant properties. It was found that no changes were caused in the protective layer.

It should be noted that modifications may be done without departing from the concept and gist of the present invention within the scope thereof as claimed hereinbelow.

What is claimed is:

1. A thin film magnetic head comprising:
   a substrate,
   a lower magnetic layer, an insulating layer, an upper magnetic layer, and a protective layer, in this order, on at least a portion of the substrate, said protective layer being formed on said upper magnetic layer and having an end face exposed to a recording medium running surface,
   wherein said protective layer consists essentially of 20 to 75 mole % of $ZrO_2$ and 25 to 80 mole % of one or both of $WO_3$ and $MoO_3$.

2. The thin film magnetic head according to claim 1 wherein not more than 20 mole % of $ZrO_2$ is replaced by at least one of $Y_2O_3$, MgO, CaO and oxides of rare earth elements.

3. The thin film magnetic head according to claim 1 wherein the protective layer has a hardness Hv of 400 to 700 $kgf/mm^2$.

4. The thin film magnetic head according to claim 1 wherein the protective layer has a residual stress not more than 0.35 GPa.

5. The thin film magnetic head according to claim 1 wherein the total amount of $WO_3$ and/or $MoO_3$ are/is present in an amount of 40 to 70 mole % in the protective layer with the balance being essentially $ZrO_2$.

6. The thin film magnetic head according to claim 1 wherein the protective layer has a thickness of 5 to 40 $\mu m$.

7. The thin film magnetic head according to claim 5 wherein the hardness Hv of the protective layer is 470–600 $kgf/mm^2$.

8. The thin film magnetic head according to claim 7 wherein the residual stress in the protective layer is not more than 0.25 GPa.

9. The thin film magnetic head according to claim 2 wherein not more than 10 mole % of $ZrO_2$ is replaced by at least one of $Y_2O_3$, MgO, CaO and oxides of rare earth elements.

* * * * *